July 5, 1927.
F. BENI ET AL
1,634,442
SAFETY ATTACHMENT FOR AEROPLANES
Filed May 19, 1926
2 Sheets-Sheet 1
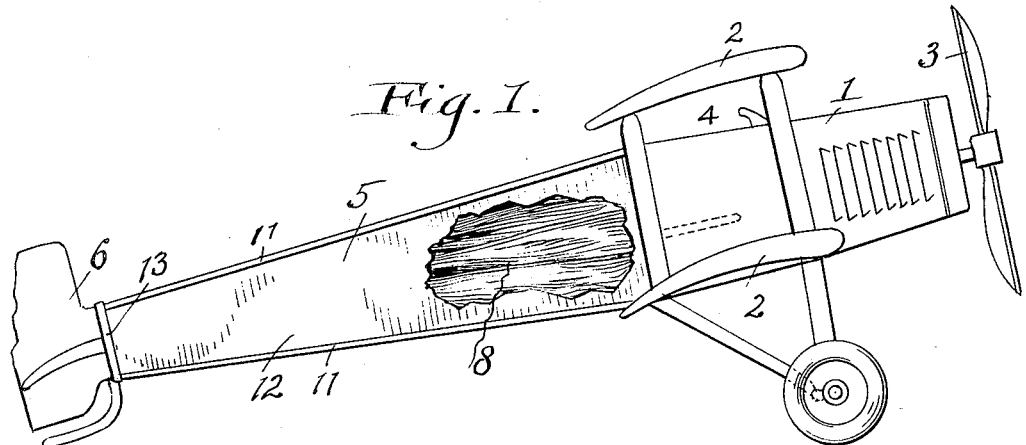
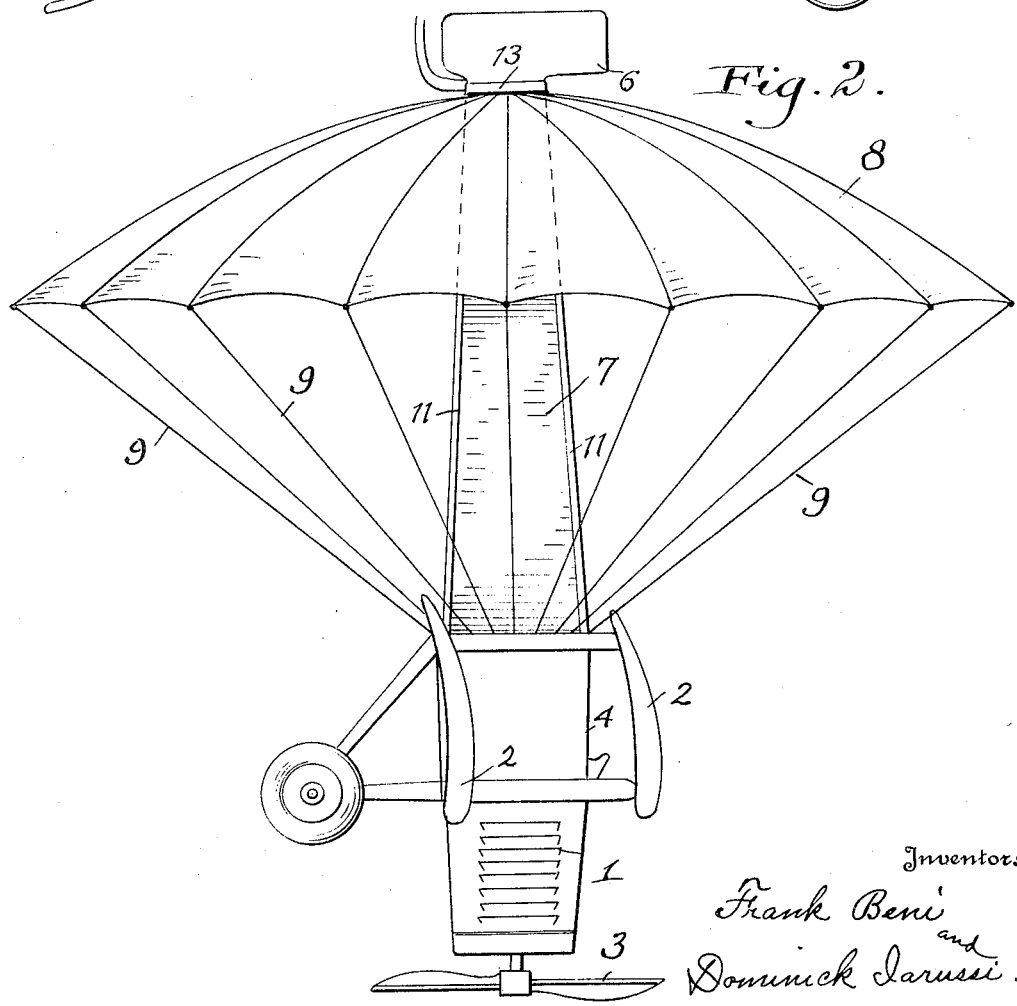
Inventors
Frank Beni and
Dominick Iarussi.
Kivis Hudson & Kent Attorneys July 5, 1927.  1,634,442
F. BENI ET AL
SAFETY ATTACHMENT FOR AEROPLANES
Filed May 19, 1926  2 Sheets-Sheet 2
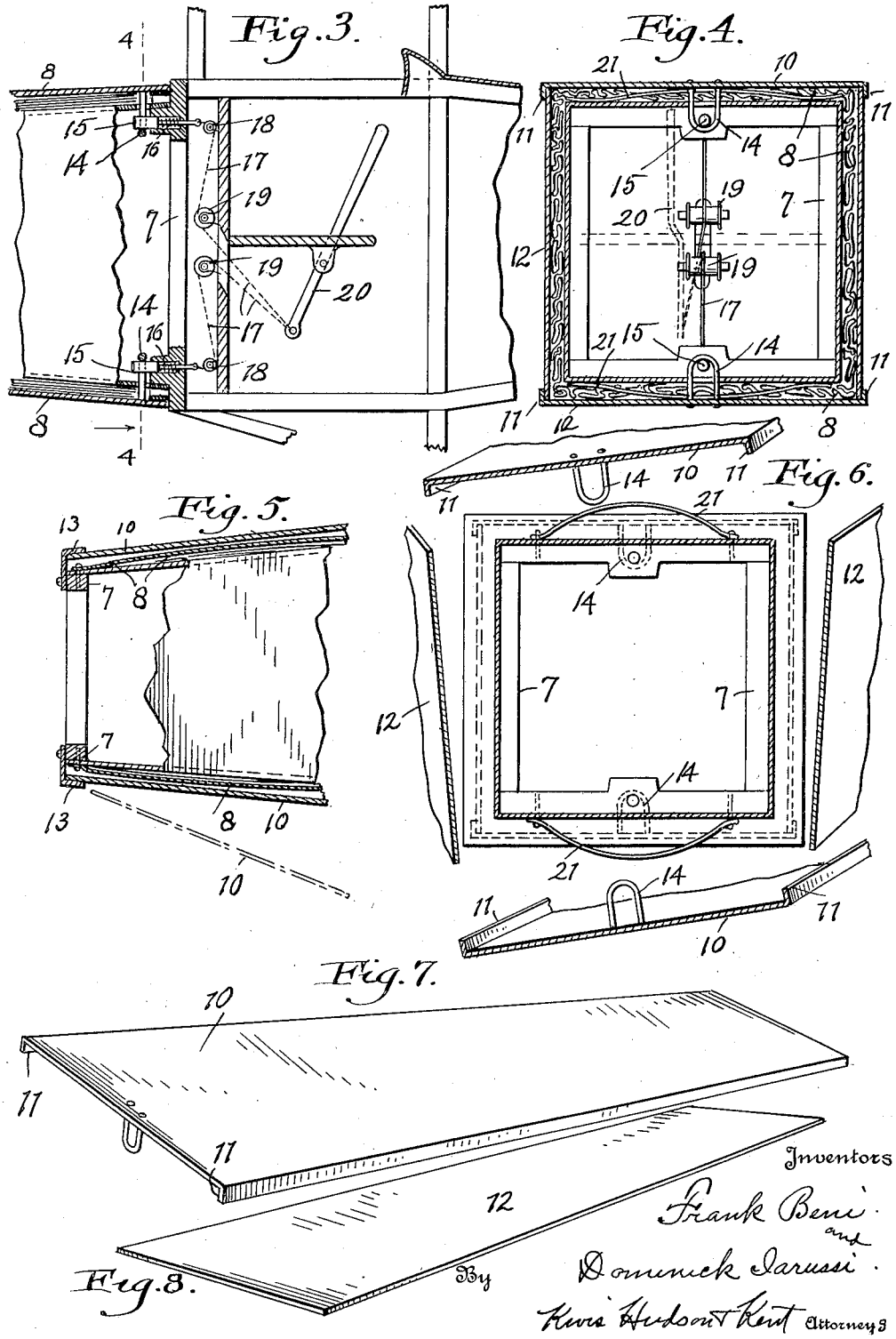

Patented July 5, 1927.

1,634,442

UNITED STATES PATENT OFFICE.

FRANK BENI AND DOMINICK IARUSSI, OF CLEVELAND, OHIO.

SAFETY ATTACHMENT FOR AEROPLANES.

Application filed May 19, 1926. Serial No. 110,151.

This invention relates to a safety attachment for aeroplanes which is operable to check the speed of descent in case of failure of the motor or under any other conditions which may cause the pilot to lose control of the plane.

The present invention aims to provide a parachute attachment for aeroplanes which, if the necessity should arise, will be capable of retarding the speed of descent but which will not impede the normal operation of the plane. More specifically it is the object of the invention to provide a parachute of sufficient size to effectively check the fall of the aeroplane to which it is attached and to entirely encase the parachute around the fuselage frame and within the outer walls of the fuselage so that the stream line construction of the fuselage may be preserved and there will be no increased air friction due to the parachute attachment. Furthermore it is the object of the invention to provide a parachute attachment which will not interfere with the rudder operating mechanism or with any other controlling mechanism associated with the plane.

With the above and other objects in view the invention may be said to comprise the device as illustrated in the accompanying drawings hereinafter described and particularly set forth in the appended claims together with such variations and modifications thereof as will be apparent to one skilled in the art to which the invention appertains.

Reference should be had to accompanying drawings forming a part of this specification in which:

Fig. 1 is a side elevation of an areoplane to which the parachute attachment is applied, a portion of one of the cover plates forming a wall of the fuselage being broken away to show a portion of the folded parachute.

Fig. 2 is a side elevation showing the parachute extended.

Fig. 3 is a central vertical section taken longitudinally through the forward portion of the fuselage.

Fig. 4 is a section taken on line 4—4 of Fig. 3.

Fig. 5 is a longitudinal section through the rear end of the fuselage frame showing the attachment of the parachute to the frame and the retaining means for the rear ends of the fuselage cover plates.

Fig. 6 is a section similar to Fig. 4 showing the fuselage cover plates released and forced outwardly from the fuselage frame by the compression springs which are interposed between the plates and the frame.

Fig. 7 is a perspective view of one of the flanged cover plates adapted to form the top or bottom wall of the fuselage.

Fig. 8 is a perspective view of one of the flat plates adapted to form a side wall of the fuselage.

Referring to the accompanying drawings the parachute attachment is shown applied to an aeroplane of a well known type having a body 1, supporting wings 2, a propeller 3 at the forward end of the body, a cock-pit 4 between the upper and lower wings and a fuselage 5 extending rearwardly from the cock-pit, the rear end of the fuselage being provided with a rudder 6 which is operated through the usual connections extending through the fuselage by a suitable lever or other controlling device in the cock-pit. The fuselage 5 has a frame 7 to which is attached a parachute 8 which is adapted to be folded around the frame. The parachute 8 is attached centrally to the rear end portion of the fuselage frame 7 and the circumferential edge of the parachute is connected with the forward end of the fuselage frame by a suitable number of flexible connecting members 9 which are preferably wire cables. When the parachute is folded upon the frame 7 the outer edge of the parachute lies adjacent to the forward end of the fuselage and the parachute is folded along radial lines and along transverse lines as may be necessary to dispose the fabric uniformly about the fuselage frame, the cables 9 being so folded upon the fuselage frame with the fabric of the parachute that when the parachute is released the cables will not interfere with the opening of the parachute and the air pressure will quickly open it.

If the fabric parachute were exposed to the air along the length of the fuselage there would be an increase in air friction whch would greatly impede the flight of the aeroplane and in addition the parachute, if continuously exposed to the weather would soon deteriorate. An important feature of the present invention is the provision of outer casing completely covering the fuselage frame and parachute surrounding it, providing a smooth exterior surface, protecting the parachute from the weather and also serving to retain the parachute in a closed position.

As shown herein the outer fuselage enclosing casing consists of top and bottom plates 10 which are provided with inturned flanges 11 along the opposite longitudinal edges thereof which are adapted to overlie and retain flat side plates 12 which extend between the top and bottom plates 11 within the edge flanges 11. The rear ends of the cover plates 10 and 12 are retained by means of a flange 13 secured to the rear end of the fuselage frame 7 and adapted to overlie the rear ends of the plates. The forward ends of the top and bottom plates 10 have staples 14 fixed thereto extending inwardly therefrom and these staples are engaged by latch bolts 15 which are slidably mounted in the fuselage frame and provided with compression springs 16 which serve to normally hold the bolts in locking positions. After the parachute has been carefully folded upon the fuselage frame the cover plates are fitted in place with their rear ends within the retaining flange 13 and with the side plates 12 positioned within the flanges 11 of the top and bottom plates. The parachute bolts 15 are engaged with the staples 14 carried by the top and bottom plates at the forward ends thereof to retain the cover plates in place.

Each of the latch bolts 15 has attached thereto a cable 17 which extends over guide sheaves 18 and 19 to the lower end of an actuating lever 20 mounted adjacent to the pilot's seat in the cock-pit. By actuating the lever 20 the latch bolts 15 may be simultaneously moved to releasing positions to free the cover plates. In order to insure the release of the cover plates upon release of the retaining latches, compression springs 21 are attached to the upper and lower sides of the fuselage frame and these springs bear against the inner sides of the top and bottom plates. When the plates are released by actuating the lever 20 to withdraw the latch bolts 15 the springs 21 instantly throw the plates 10 outwardly away from the fuselage frame and this outward movement of the plates 10 releases the side plates 12 so that all of the plates may fall freely away from the fuselage. The release of the cover plates allows air to enter within the folded parachute to open the same and the parachute when opened serves to check the speed of the falling plane.

Having thus described our invention, we claim:

1. The combination with an aeroplane having a fuselage, of a parachute adapted to be folded about the fuselage frame and attached at its center to the rear end portions of the fuselage frame, cover plates separate from the parachute and completely enclosing the parachute and fuselage frame, releasable means for securing said cover plates to the frame, and means for operating said securing means to release the plates from the frame to permit the parachute to open.

2. The combination with an aeroplane having a fuselage, of a parachute formed of flexible fabric adapted to be folded about the fuselage frame and attached at its center to the rear end portion of the fuselage frame, cover plates separate from the parachute completely enclosing the parachute and fuselage frame, releasable means for securing said cover plates to the frame, means for operating said securing means to release the plates from the frame to permit the parachute to open and means acting automatically to force the plates outwardly from the frame upon release thereof.

3. The combination with an aeroplane having a fuselage, of a parachute enclosing the fuselage frame and secured centrally thereto adjacent the rear end thereof, said parachute being adapted to be folded around the fuselage frame, cover plates encasing the parachute and fuselage frame, certain of said plates overlapping other of said plates to retain the same, latches carried by the frame and engageable with said first mentioned plates, springs interposed between said first mentioned plates and said frame, and manually operable means for simultaneously releasing said latches.

4. The combination with an aeroplane having a fuselage, of a parachute enclosing the fuselage frame and secured centrally thereto adjacent the rear end thereof, said parachute being adapted to be folded around the fuselage frame, cover plates encasing the parachute and fuselage frame, certain of said plates overlapping other of said plates to retain the same, latches carried by the frame and engageable with said first mentioned plates, springs interposed between said first mentioned plates and said frame, a lever adjacent the pilot's seat, and means connecting said lever and latches whereby the latches may be simultaneously released upon actuation of said lever.

5. The combination with an aeroplane having a fuselage substantially rectangular in cross section, of a parachute enclosing the fuselage frame and secured centrally thereto adjacent the rear end thereof, said parachute being adapted to be folded around the fuselage frame, substantially flat cover plates for opposite sides of said frame, cover plates for the remaining two sides of the frame having flanges at the side edges thereof adapted to overlie the edges of said flat plates to retain the same in place, retaining flanges at the rear end of the frame overlying the ends of said cover plates, and latches at the forward end of the frame for releasably securing said flanged plates.

6. The combination with an aeroplane having a fuselage substantially rectangular in cross section, of a parachute enclosing the fuselage frame and secured centrally thereto adjacent the rear end thereof, said parachute being adapted to be folded around the fuselage frame, substantially flat cover plates for opposite sides of said frame, cover plates for the remaining two sides of the frame having flanges at the side edges thereof adapted to overlie the edges of said flat plates to retain the same in place, retaining flanges at the rear end of the frame overlying the ends of said cover plates, latches at the forward end of the frame for releasably securing said flanged plates, and springs interposed between the forward ends of the flanged plates and the fuselage frame for forcing said plates outwardly when the latches are released.

In testimony whereof, we hereunto affix our signatures.

FRANK BENI.
DOMINICK IARUSSI.